UNITED STATES PATENT OFFICE.

KNUT O. DUFVA, OF ST. PAUL, MINNESOTA; MATHILDA DUFVA EXECUTRIX OF SAID KNUT O. DUFVA, DECEASED.

CEMENTING COMPOSITION.

1,407,194. Specification of Letters Patent. Patented Feb. 21, 1922.

No Drawing. Application filed May 13, 1918. Serial No. 235,032.

*To all whom it may concern:*

Be it known that I, KNUT O. DUFVA, a citizen of the United States, residing at St. Paul, in the county of Ramsey and State of Minnesota, have invented a new and useful Improvement in Cementing Compositions.

The object of my invention is in the production of a cementing composition to be applied to metal surfaces such as steam engines, steam pipes, receptacles and other conduits such as water pipes or metal articles where it is desired to cement or seal a joint or crevice to stop any leakage through the same.

My composition consists of a mixture of common paint, or any pigment mixed with a suitable oil such as linseed oil, rosin or colophony, dry steel emery, which is composed of corundum and finely divided steel particles, or iron filings with or without a suitable quantity of liquid shellac, the shellac being used to quicken the drying where it is desired. The paint, rosin and shellac forming a vehicle to carry the mineral particles in suspension in the composition.

The term steel emery is used for convenience to designate finely divided steel particles mixed with natural aluminum oxide, or what is commonly known as corundum. It is obvious that any finely divided insoluble mineral of a hard nature is suitable in place of what is termed the steel emery, or natural aluminum oxide can be used in place of a metallic powder and of a coarse or fine nature, depending upon the use of the cement, and the mineral used in the cement being of such a nature as to most nearly conform with the article being cemented.

In preparing the composition I prefer to use the ingredients in about the following proportions—viz:

One pint of paint, or any suitable pigment mixed with the proper amount of linseed or drying oil, one pint of rosin, one pint of dry steel emery or iron filings and one-half pint of liquid shellac. The proportions and amount of the ingredients may be varied within a reasonable limit and still give a composition which will give equally good results as the proportions herein stated.

In mixing the above ingredients the rosin is heated to a sufficient temperature to melt the same and the paint heated to a temperature so as to allow the rosin to be conveniently and thoroughly mixed with the paint. After the paint and rosin are thoroughly mixed the dry steel emery is added and mixed thoroughly with the paint and rosin and if it is desired the shellac is added after the mixture has cooled sufficiently to conveniently mix the shellac with the other ingredients.

The best results are obtained by using steel emery, which is practically entirely composed of hard steel particles either of about the fineness of flour or coarse particles, depending on where it is desired to use the cement. Suitable metal filings with a small amount of ordinary emery dust therein can be used in my composition or in place of the steel emery other suitable hard minerals or metal filings either fine or coarse may be used to take the place of the steel emery.

The cementing composition is adapted to cement or seal crevices, joints, openings or threads to make them steam or water tight and gives an elastic sealing composition of a gum like nature which is capable of expanding and contracting to completely and perfectly seal the joints on which it is used. The vehicle of the composition holds the fine particles of the steel emery, metal filings or other suitable minerals in suspension and when the cement is used on steam joints the steam pressure can be applied immediately after the cement is applied and the joints put together. The pressure of the steam causes the fine mineral particles to plug any crevices and the heat of the steam causes the vehicle or body of the cement to become sufficiently set to hold the mineral particles in place, thus sealing the joint and preventing any leakage. Locomotive cylinder heads may be perfectly sealed by the use of my composition, without necessitating the grinding of the abutting surfaces, to form a steam tight joint, by merely rubbing the surfaces to be joined, fairly smooth with emery cloth, or other suitable substance and applying a coat of my cementing composition. As soon as the cylinder head is replaced the cylinder is ready for use, the heat of the steam setting the cement and the fine mineral particles in the same plugging any crevices so as to perfectly seal the joint. The elasticity of the body or vehicle of the cement and the mineral particles therein allow the same to expand and contract sufficiently to perfectly seal the joint which apparently becomes tighter with age and which does not rust the surface and cause oxidization of the surface on which the same is used. The cement can be used for other steam joints to perfectly seal the same without necessitating a large amount of labor especially where it has been, heretofore, necessary to grind the surface to obtain a steam tight joint.

In the use of the composition where it is desired to have the same set quickly, it is more desirable to use the shellac but the cement can be used with good results without the shellac. The cement can also be used for cold water pipes or other conduits containing internal pressure to seal joints or crevices to prevent leaks. The mineral particles of the cement are adapted to be wedged into the crevices while the body or vehicle is of a sufficient gummy nature to hold the mineral particles in place and thus plug the openings or crevices sufficiently to seal the joint.

In the use of my composition where it is desired to seal flat abutting surfaces such as cylinder heads, ball joints, etc. of locomotives, the cementing composition forms a sealing medium to completely seal the joints, and becoming sufficiently hard but allowing the joints to be taken apart when it is desired without injury to the metal, after which they can be again perfectly sealed by the use of my cement. It is preferred to use my cement on steam or hot water joints, but good results may also be obtained by the addition of the shellac in the composition where it is desired to use it to seal cold water joints or other suitable receptacles containing an internal pressure.

My composition is easily and quickly applied, saving a large amount of labor, being impervious to water and, as a whole, possessing in a high degree all of the desired properties of a cementing composition for sealing the joints of steam boilers, steam pipes and other receptacles containing a pressure.

I claim:

1. A cementing composition comprising paint, rosin, iron filings and shellac.

2. A cementing composition for sealing metal joints which are adapted to carry an internal pressure comprising a suitable pigment mixed with linseed oil, colophony and hard mineral substance in powdered form; in about the proportions herein specified.

3. A cementing composition for sealing metal joints which are adapted to carry an internal pressure comprising a suitable pigment mixed with a drying oil, colophony, hard mineral substance in powdered form and shellac; in about the proportions herein specified.

4. A cementing composition comprising the following ingredients mixed in the following proportions by volume; one part of paint; one part of rosin; one part of iron filings; one-half part of liquid shellac.

5. A cementing composition comprising a vehicle, rosin, a drying medium, iron filings and powdered corundum.

6. A cementing composition comprising minute metal particles, powdered corundum and a vehicle adapted to form a resilient sealing medium.

7. In a cementing composition, consisting of a vehicle, rosin, shellac and a granular filler adapted to form a resilient sealing medium.

8. In a cementing composition consisting of common paint, rosin, steel emery and shellac, in about the proportions herein stated.

9. A cementing composition comprising linseed oil, a pigment, rosin and minute metal particles.

KNUT O. DUFVA.